United States Patent
Ker et al.

(10) Patent No.: US 7,147,330 B2
(45) Date of Patent: Dec. 12, 2006

(54) PORTABLE EYES PROTECTOR FOR PREVENTING THE USER'S EYES FROM BECOMING MYOPIC

(76) Inventors: Cappi Ker, 1004 Wedgewood Dr., Ruston, LA (US) 71270; Min Chang Wu, 6F-2, No. 33, Lan 360, Sec. 1, Jhonggang Rd., Taichung City (TW); Mulian Li, 289 Wesley, Ruston, LA (US) 71270

( * ) Notice: Subject to any disclaimer, the term of this patent is extended or adjusted under 35 U.S.C. 154(b) by 435 days.

(21) Appl. No.: 10/742,847

(22) Filed: Dec. 23, 2003

(65) Prior Publication Data

US 2005/0146684 A1   Jul. 7, 2005

(51) Int. Cl.
A61H 5/00 (2006.01)
G01C 3/00 (2006.01)
A61B 3/00 (2006.01)

(52) U.S. Cl. .................. 351/208; 351/200; 351/203
(58) Field of Classification Search ............ 401/30–33, 401/39, 41, 258; 351/203, 204, 208
See application file for complete search history.

(56) References Cited

U.S. PATENT DOCUMENTS 3,699,857 A * 10/1972 Wagner et al. ............... 396/279
6,592,223 B1 * 7/2003 Stern et al. ................. 351/239

* cited by examiner

Primary Examiner—Charles A Marmor
Assistant Examiner—John R Sanders
(74) Attorney, Agent, or Firm—Rosenberg, Klein & Lee

(57) ABSTRACT

A portable eyes protector for preventing the user's eyes from becoming myopic includes a body and a brightness sensor mounted in the body and flush with an outer periphery of the body for sensing a brightness of the surrounding environment. A distance measurer is mounted to the body for measuring a distance between the user's eyes and a tabletop.

whereby the brightness sensor is provided to confirm that the brightness of the surrounding environment is bright enough for reading and the distance measure is provided to remind the user to maintain a suitable pose during reading.

7 Claims, 12 Drawing Sheets

PORTABLE EYES PROTECTOR FOR PREVENTING THE USER'S EYES FROM BECOMING MYOPIC

BACKGROUND OF THE INVENTION

1. Field of the Invention

The present invention relates to portable eyes protector, and more particularly to a portable eyes protector for preventing the user's eyes from becoming myopic.

2. Description of Related Art

As usual, the causes of myopia include the brightness of environment, the diet habit, the reading pose and distance and the reading frequency, etc. In the above causes, the brightness of environment and the reading pose and distance can be controlled. Consequently, an eyes protector for measuring the brightness of the reading environment to prevent the user's eyes from being myopic is marketed.

The conventional portable eyes protector in accordance with the prior art shown in FIG. 11 comprises a casing (5) adapted to be put on a tabletop. A photosensitive resistance (not shown), transistor (not shown), a battery (not shown) are mounted in the casing for sensing the brightness of the surrounding environment. The conventional portable eyes protector provides an alarm to the user when the brightness of the surrounding environment is insufficient for reading to prevent the user from becoming myopic.

However, the conventional portable eyes protector only sensing the brightness, but not distance between the book and the eyes of the user. Consequently, the user may become myopic when having an improper pose during reading.

As a result, another conventional eyes protector in accordance with the prior art shown in FIG. 11 comprises base member (7) secured on the tabletop (9) and a telescopic device (8) is mounted to the base member (7). The base member (7) includes a wing plate (71) extending therefrom and secured on a bottom of the tabletop (9). A slot (72) is defined in the base member (7).

The telescopic device (8) includes a hollow rod (81) perpendicularly mounted to the base member (7) and having a first end securely received in the slot (72) in the base member (7). A telescopic rod (82) is partially and slidably received in the hollow rod (81) and selectively secured when the telescopic rod (82) extending to a suitable length relative to the base member (7). A stopper (83) is laterally mounted to a free end of the telescopic rod (82) and parallel to the tabletop (9). The stopper (83) is provided to abut against the chest of the user for maintaining a suitable pose during reading to prevent the eyes of the user from becoming myopic.

However, the eyes protector, as shown in FIG. 12, has no sensor for sensing the brightness of the surrounding environment and cannot be portable. Consequently, the user may become myopic due to an insufficient brightness of the surrounding environment.

The present invention has arisen to mitigate and/or obviate the disadvantages of the two conventional eyes protector.

SUMMARY OF THE INVENTION

The main objective of the present invention is to provide an improved portable eyes protector for preventing the user's eyes from becoming myopic.

To achieve the objective, the portable eyes protector in accordance with the present invention comprises a body and a brightness sensor mounted in the body and flush with an outer periphery of the body for sensing a brightness of the surrounding environment. A distance measurer is mounted to the body for measuring a distance between the user's eyes and a tabletop. The brightness sensor is provided to confirm that the brightness of the surrounding environment is bright enough for reading and the distance measure is provided to remind the user to maintain a suitable pose during reading.

Further benefits and advantages of the present invention will become apparent after a careful reading of the detailed description with appropriate reference to the accompanying drawings.

DETAILED DESCRIPTION OF THE INVENTION

Figure 1:
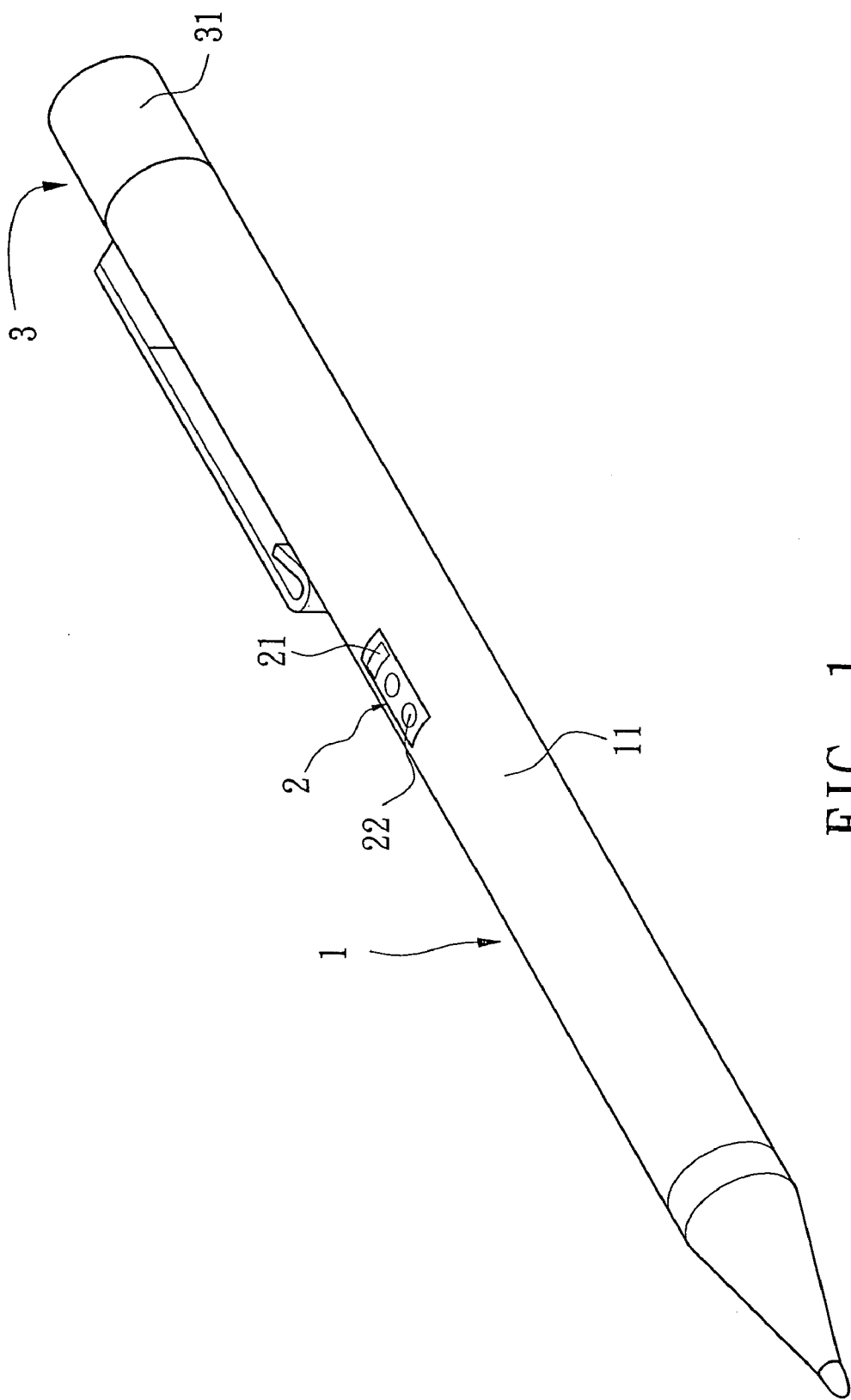
FIG. 1 is a perspective view of a first embodiment of a portable eyes protector for preventing the user's eyes from becoming myopic in accordance with the present invention.
Figure 2:
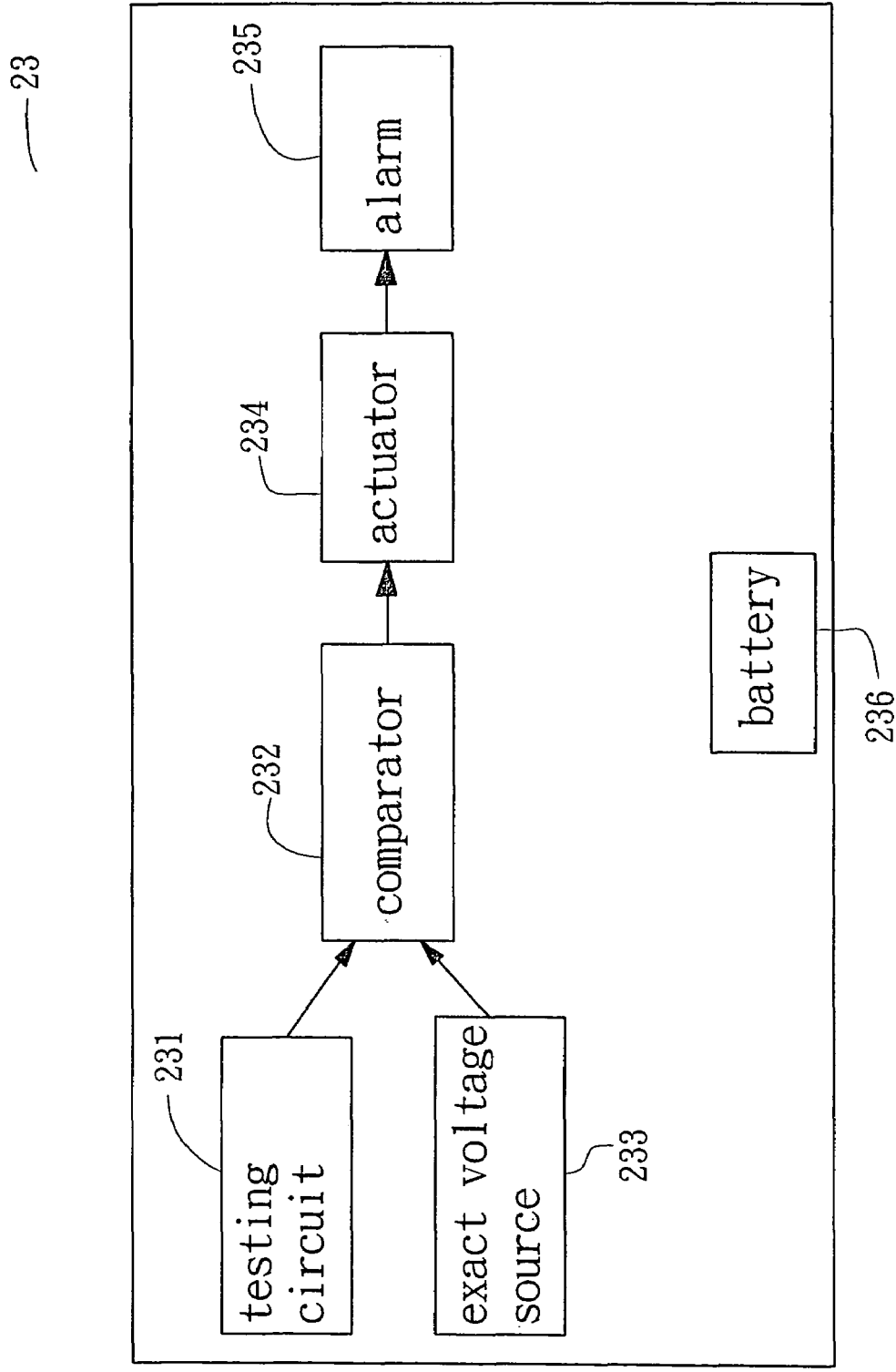
FIG. 2 is a flow chart of the portable eyes protector in FIG. 1 for sensing the brightness of the surrounding environment.
Figure 3:
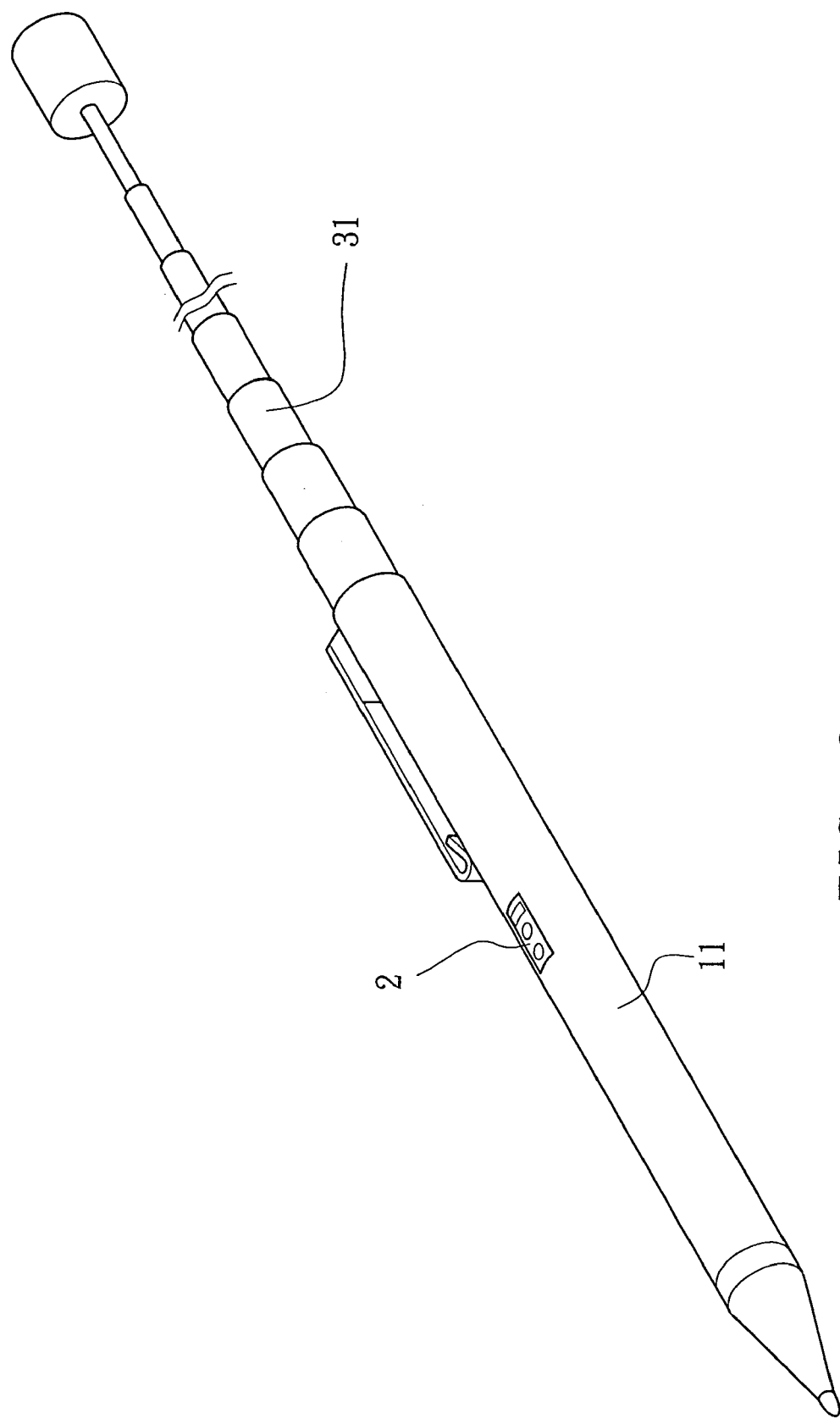
FIG. 3 is a perspective view of the portable eyes protector in FIG. 1 when the telescopic rod extending.

Referring to the drawings and initially to FIGS. 1–10, a portable eyes protector for preventing the user's eyes from becoming myopic in accordance with the present invention comprises body (1), a brightness sensor (2) mounted in the body (10) and a distance measure (3) mounted to and being telescopic relative to the body (1).

With reference to FIGS. 1–4 that show a first embodiment of the portable eyes protector in accordance with the present invention, the body (1), in the preferred embodiment of the present invention, is a writing instrument (11) that includes a shank (110) having a first writing end and a second end opposite to the first writing end of the shank (110). The brightness sensor (2) is mounted in the shank (110) and flush with an outer periphery of the shank (110). The brightness sensor (2) includes an electric device (23) with an intensity reflector for measuring the brightness and alarming by sound or lighting. The brightness sensor (2) includes a switch (21) for starting the electric element (23) and a lamp (22) for showing the light ray with different colors. The electric device (23) includes a comparator (232). A testing circuit (231), an exact voltage source (233) and an actuator (234)

respectively electrically connected to the comparator (232). An alarm (235) is electrically connected to the actuator (234) and the lamp (22) and a battery (236) is electrically connected to the electric device (23) for providing power. The testing circuit (231) transfers the sensed brightness signal into a voltage signal. The volt value from the exact voltage source (233) is sued as a standard brightness for protecting user's eyes from becoming myopic. The volt value from the exact voltage source (233) is set relative to a need of the user. As usual, best brightness for reading is between 200 to 500 lux. Consequently, the volt value from the exact voltage source (233) is set on 201 lux and transmitted to the comparator (232). The voltage signal from the testing circuit (231) is transmitted into the comparator (232) and compared with the volt value from the exact voltage source (233). The comparator (232) transmits a start signal to the actuator (234) that turns on the lamp (22) of the alarm (235) when the voltage signal from the testing circuit (231) is smaller than the volt value from the exact voltage source (233).

The distance measurer (3), in the preference embodiment, is a telescopic rod (31) that is mounted to the second end of the shank (110) of the writing instrument (11). The total of the portable eyes protector of the present invention is set from 40 to 50 centimeters.

Figure 4:
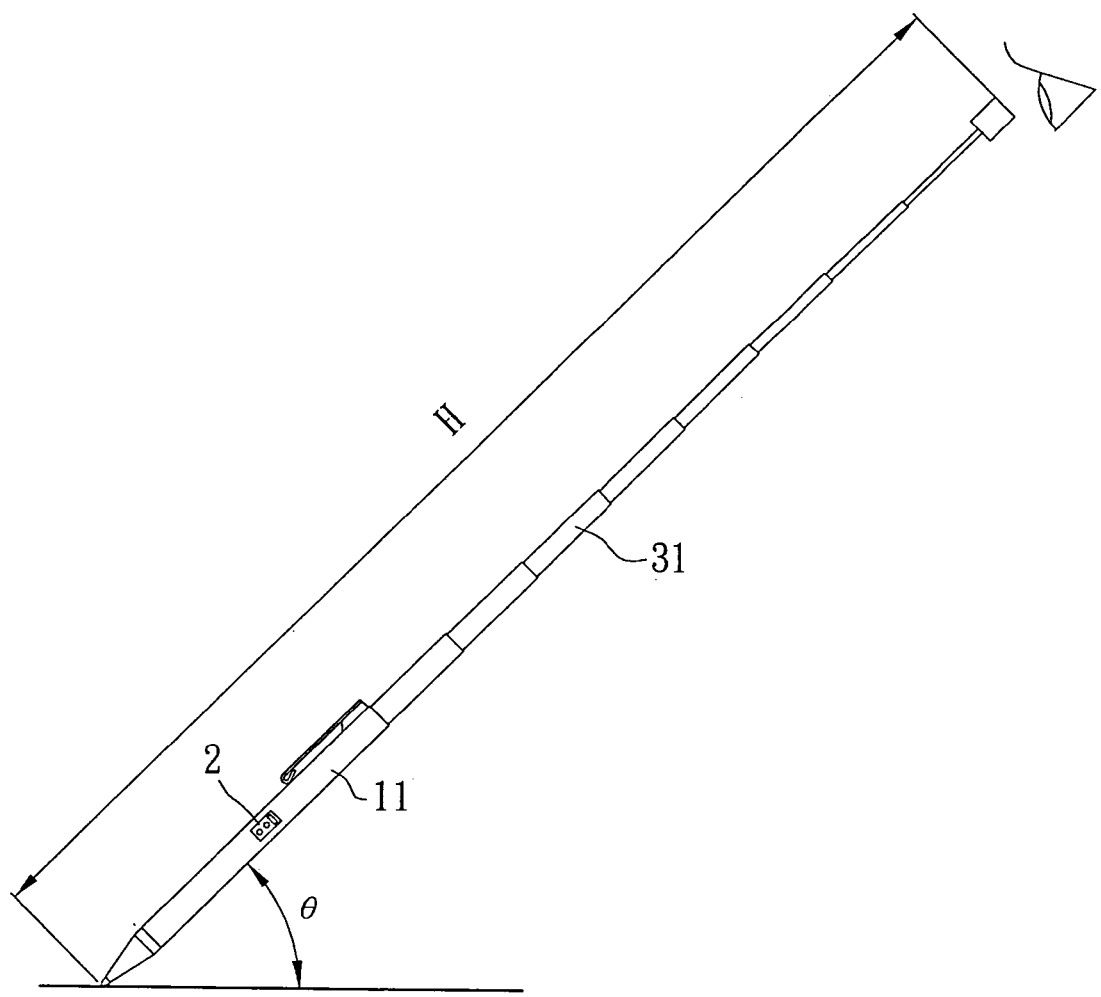
FIG. 4 is a side operational view of the portable eyes protector in FIG. 3.

To operate the portable eyes protector, with reference to FIG. 4, the writing instrument (11) is put on the desk in the reading environment. The switch (21) of the brightness sensor (2) is turned on for measuring the brightness of the surrounding environment. The lamp (22) shoots red light for reminding the user to increase the brightness when the brightness of the surrounding environment under 201 lux and the lamp (22) shoots green light for reminding the user to have a safe read when the brightness of the surrounding environment over 201 lux. Then, the first writing end of the shank (110) abuts the tabletop to form an angle between 45 to 60 degrees and the telescopic rod (31) extends toward the eyes of the user for the user to maintain a suitable pose and the distance between the tabletop and the eyes of the user. In the preferred embodiment of the present invention, the body (1) is designed as a writing instrument (11) so that the portable eyes protector is easily carried.

Figure 5:
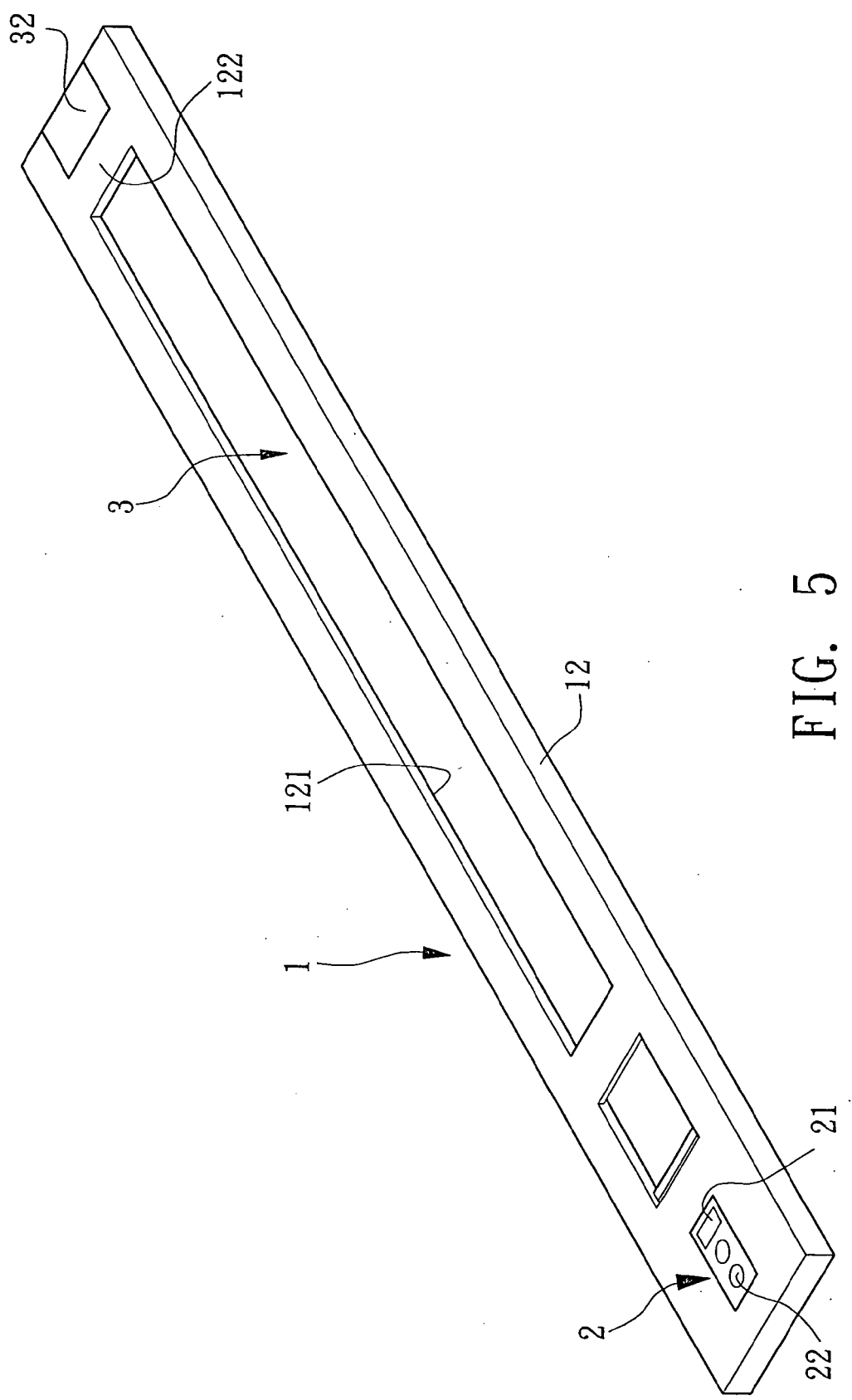
FIG. 5 is a perspective of a second embodiment of a portable eyes protector in accordance with the present invention.
Figure 6:
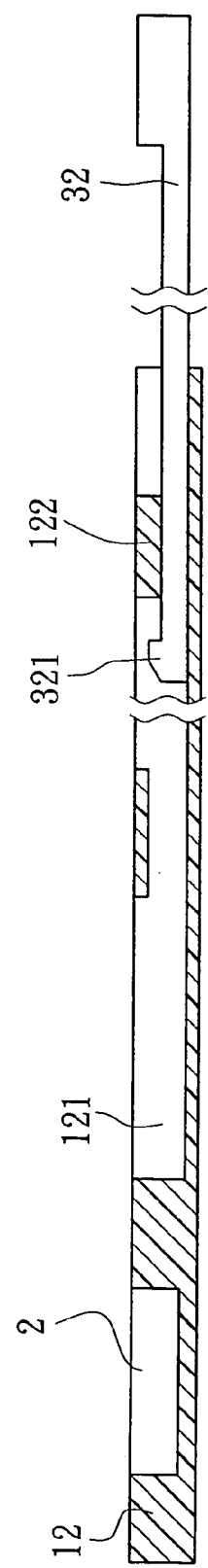
FIG. 6 is a cross-sectional view of the portable eyes protector in FIG. 5 when the telescopic ruler extending.

With reference to FIGS. 5 and 6 that show a second embodiment of the portable eyes protector of the present invention, the body (1) is designed as a ruler (12), wherein the brightness sensor (2) is buried in the ruler (12) and flush with a top surface of the ruler (12) and the distance measurer (3) is designed as a telescopic plank (32) that is partially slidably received and longitudinally moved relative to the ruler (12). A groove (121) is longitudinally defined in the ruler (12) for partially receiving the telescopic plank (32) and a stopper (122) downward extending from the ruler (12) into the groove (121). The telescopic plank (32) includes one end slidably received in the groove (121) and having a protrusion (321) extending therefrom and selectively engaged to the stopper (122) of the ruler (12). The total length of the portable eyes protector of the embodiment of the present invention is set between 40 cm and 50 cm when the protrusion (321) is engaged to the stopper (122) of the ruler (12).

Figure 7:
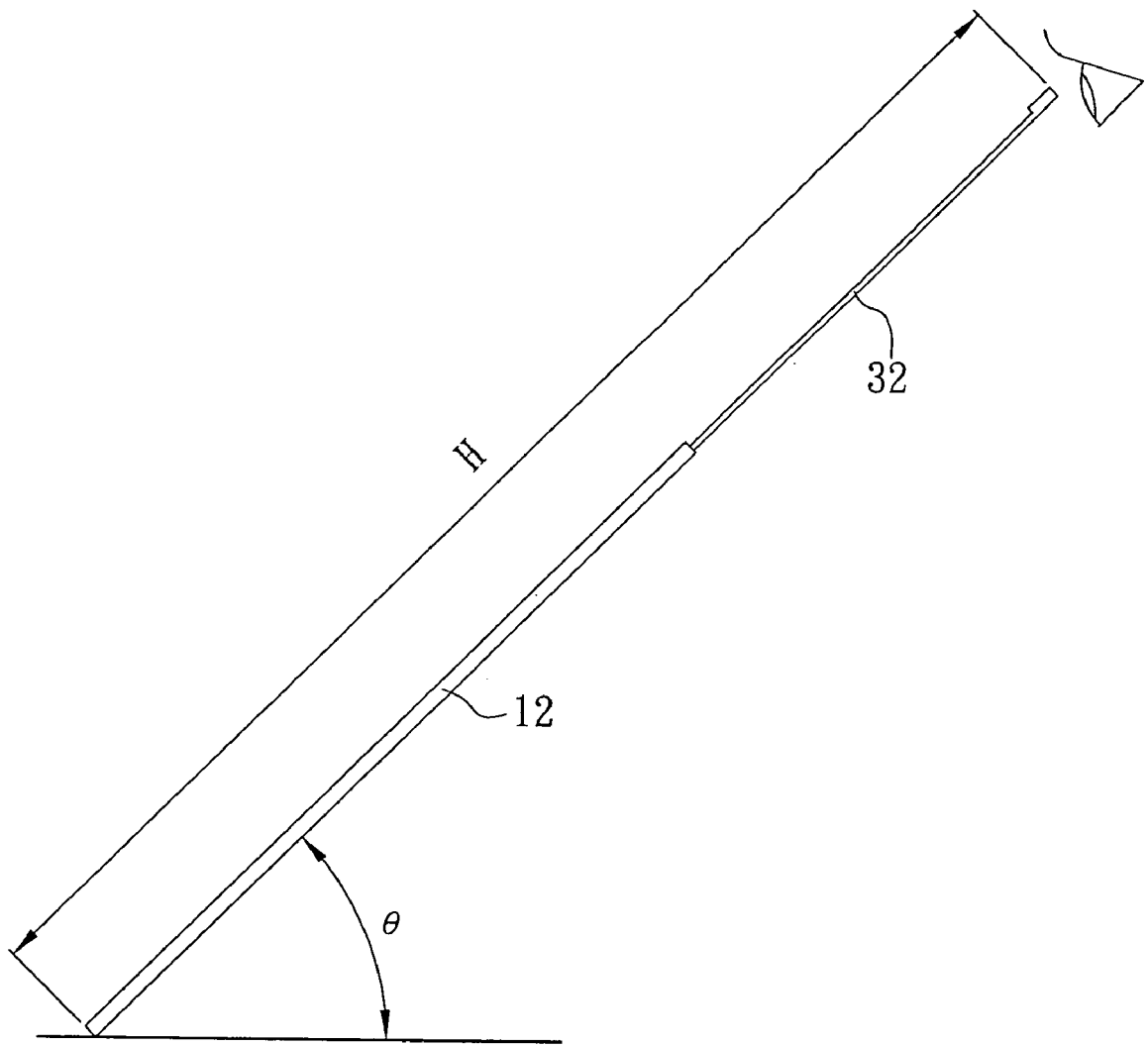
FIG. 7 is a side operational plan view of the portable eyes protector in FIG. 6.

With reference to FIG. 7, to operate the portable eyes protector of the preferred embodiment of the present invention, the ruler (12) is put on the desk in the reading environment. The switch (21) of the brightness sensor (2) is turned on for measuring the brightness of the surrounding environment. Then, one end of the ruler (12) abuts the tabletop to form an angle between 45 to 60 degrees and the telescopic plank (32) extends toward the eyes of the user for the user to maintain a suitable pose and the distance between the tabletop and the eyes of the user.

Figure 8:
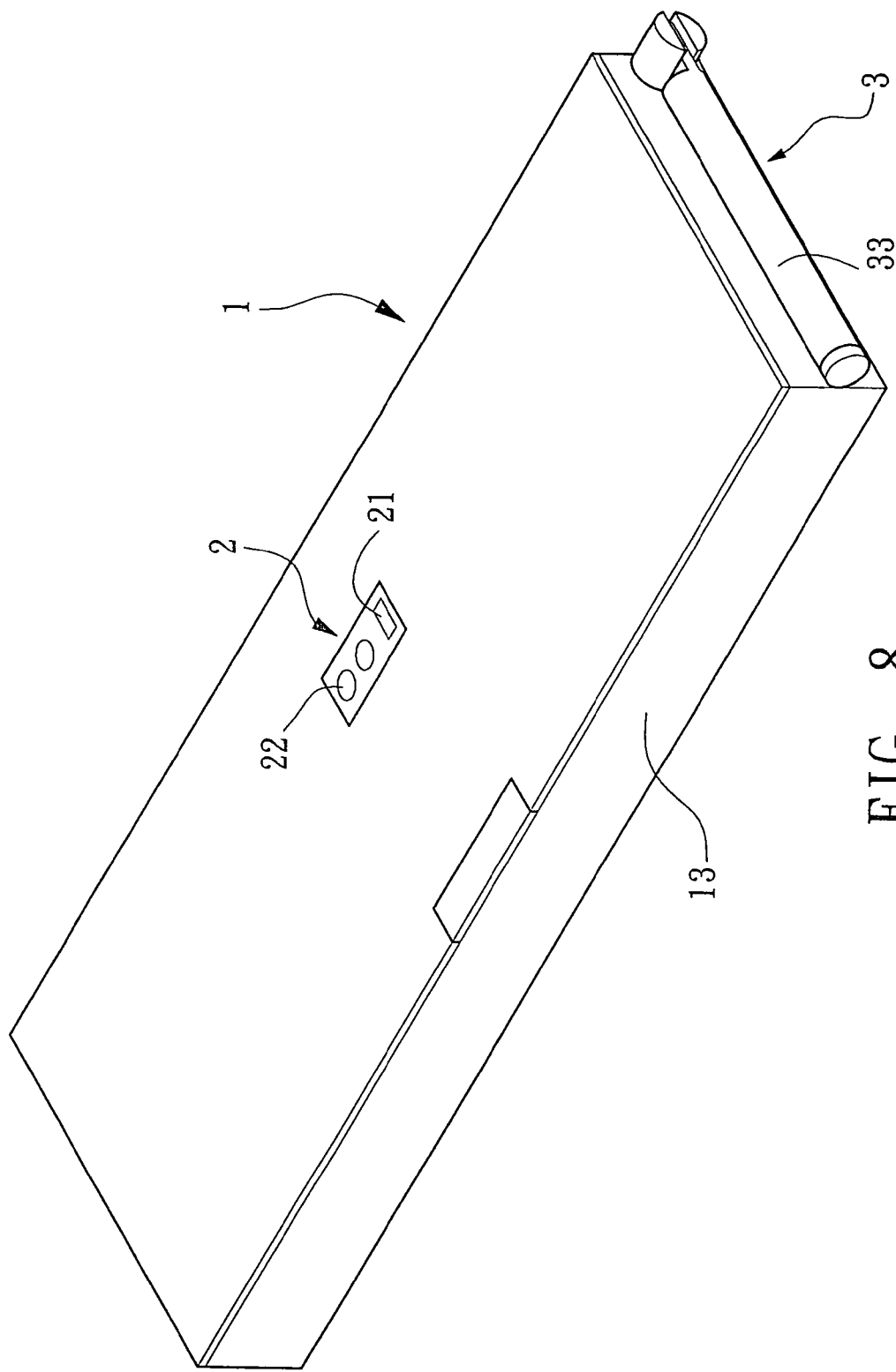
FIG. 8 is a perspective view of a third embodiment of a portable eyes protector in accordance with the present invention.
Figure 9:
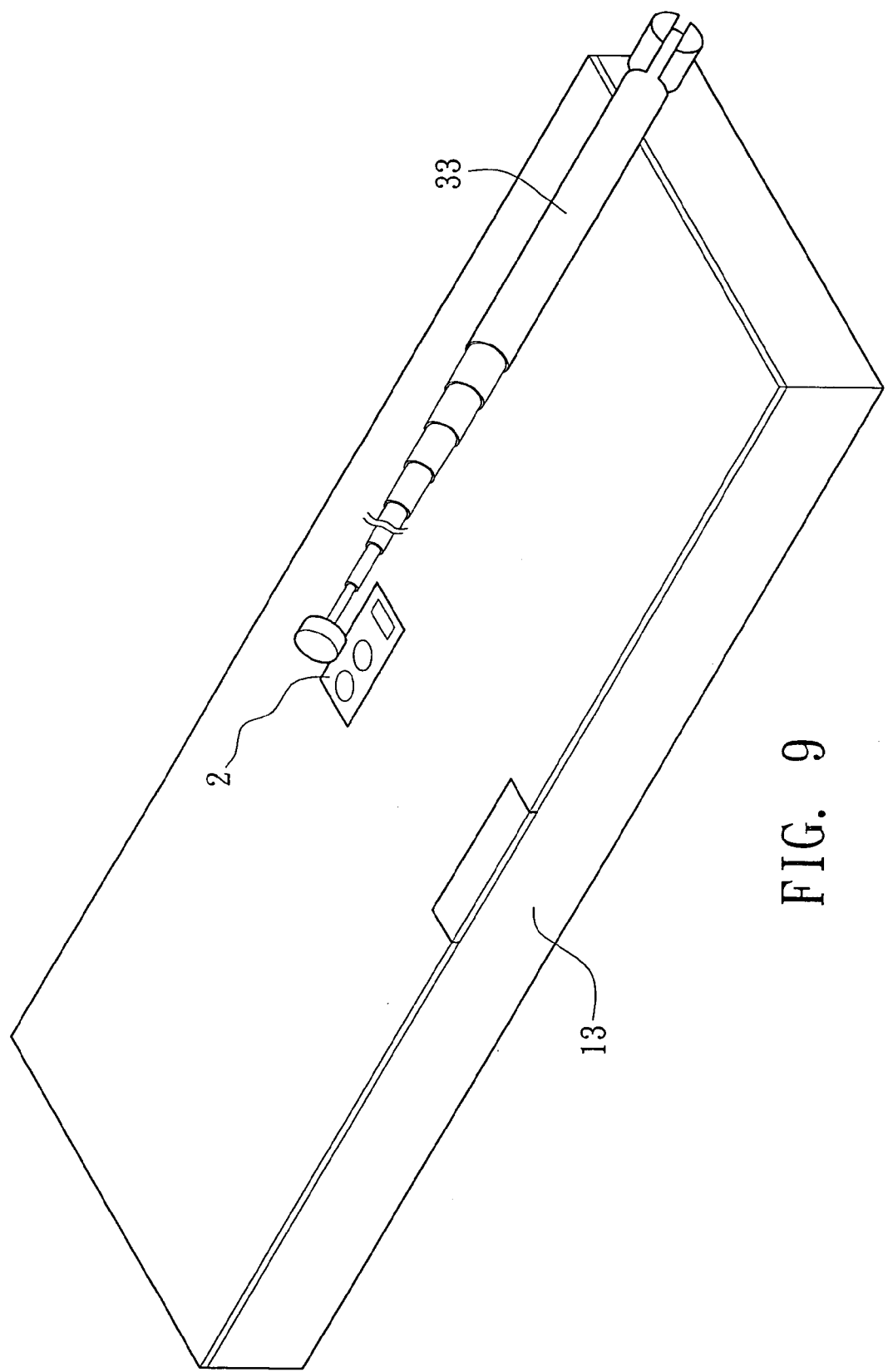
FIG. 9 is a perspective view of the portable eyes protector in FIG. 8 when the telescopic rod extending.

With reference to FIGS. 8 and 9 that show a third embodiment of the portable eyes protector of the present invention, the body (1) is designed as a pencil case (13), and the distance measurer (3) is designed as a telescopic rod (33) that is laterally mounted to one side of the pencil case (13). The total length of telescopic rod (33) is set between 40 cm to 50 cm when the telescopic rod (33) fully extends.

Figure 10:
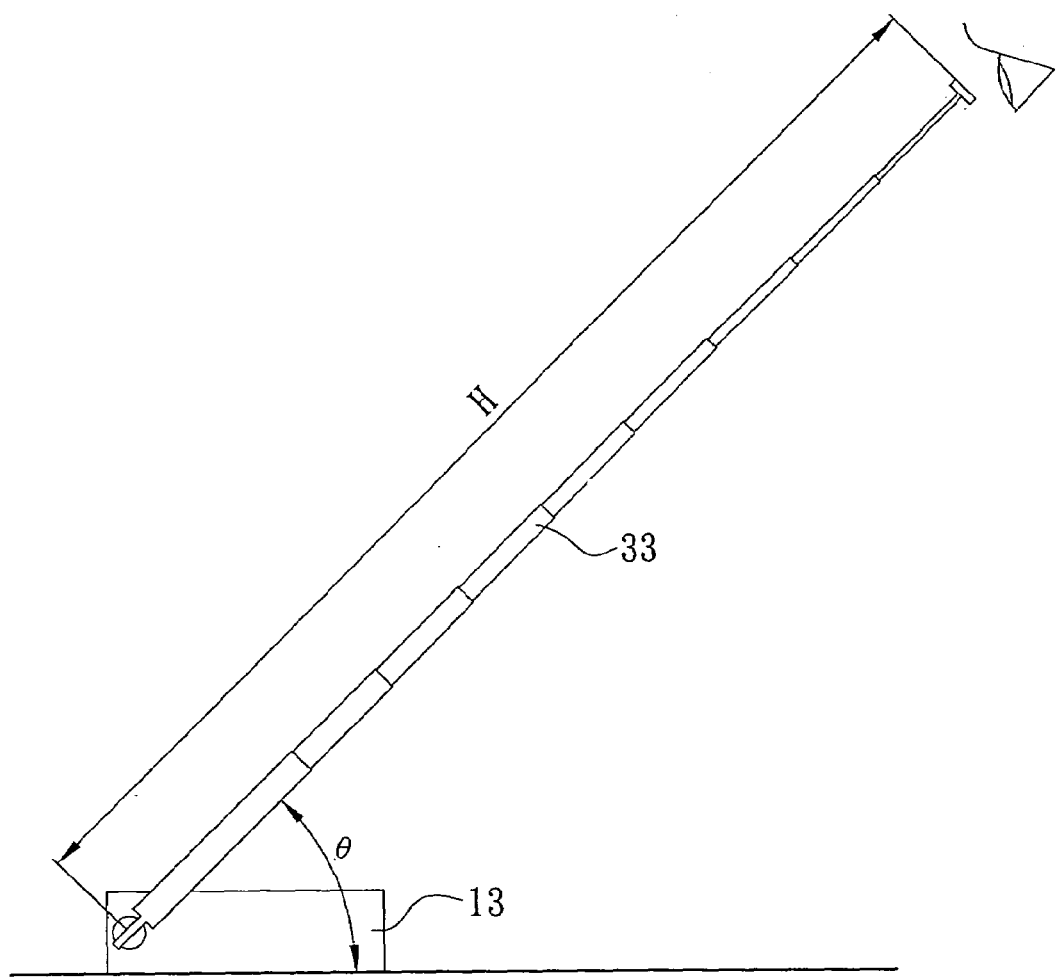
FIG. 10 is a side operational view of the portable eyes protector in FIG. 9.
Figure 11:
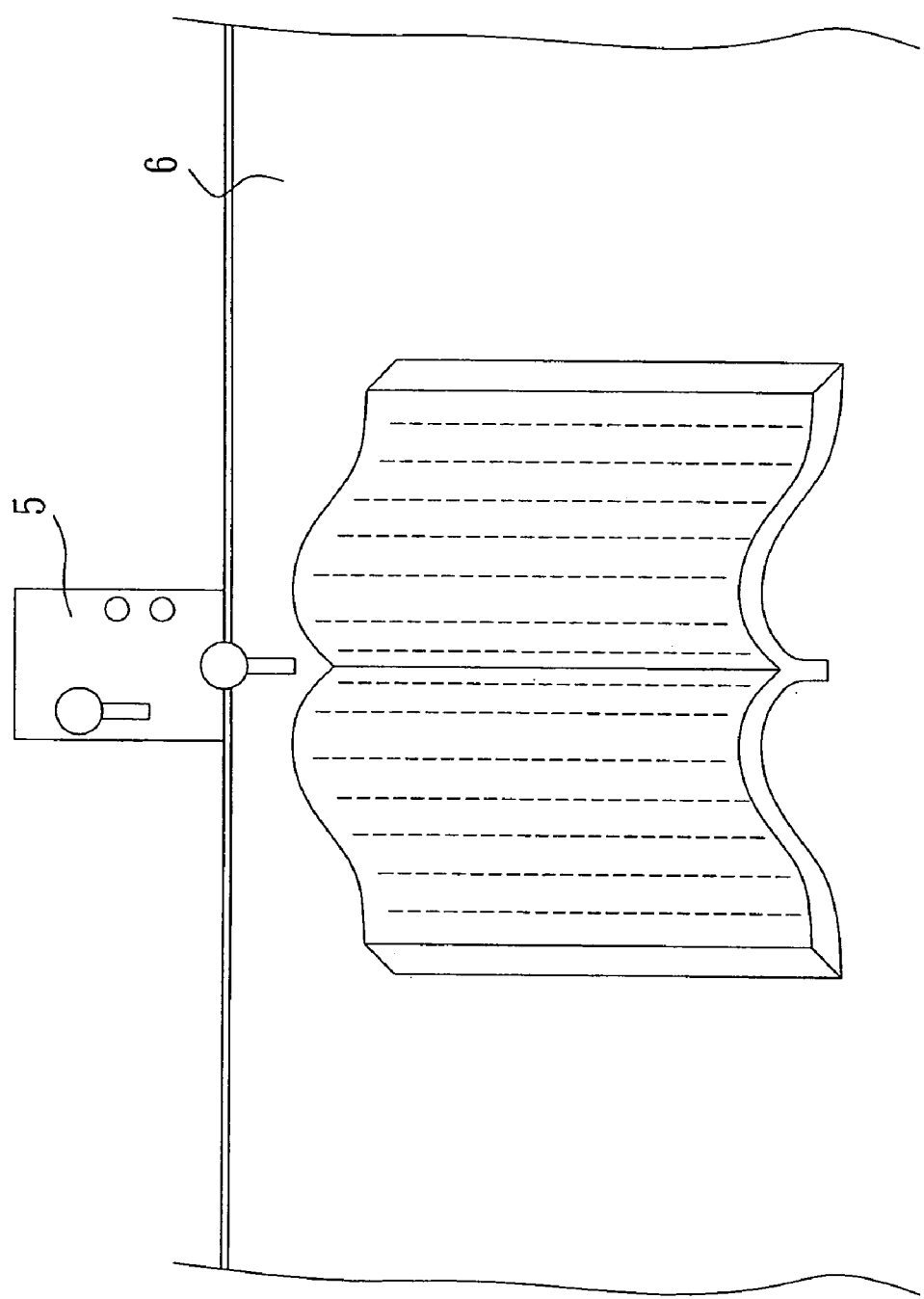
FIG. 11 is a conventional eyes protector for preventing the user's eyes from becoming myopic in accordance with the prior art.
Figure 12:
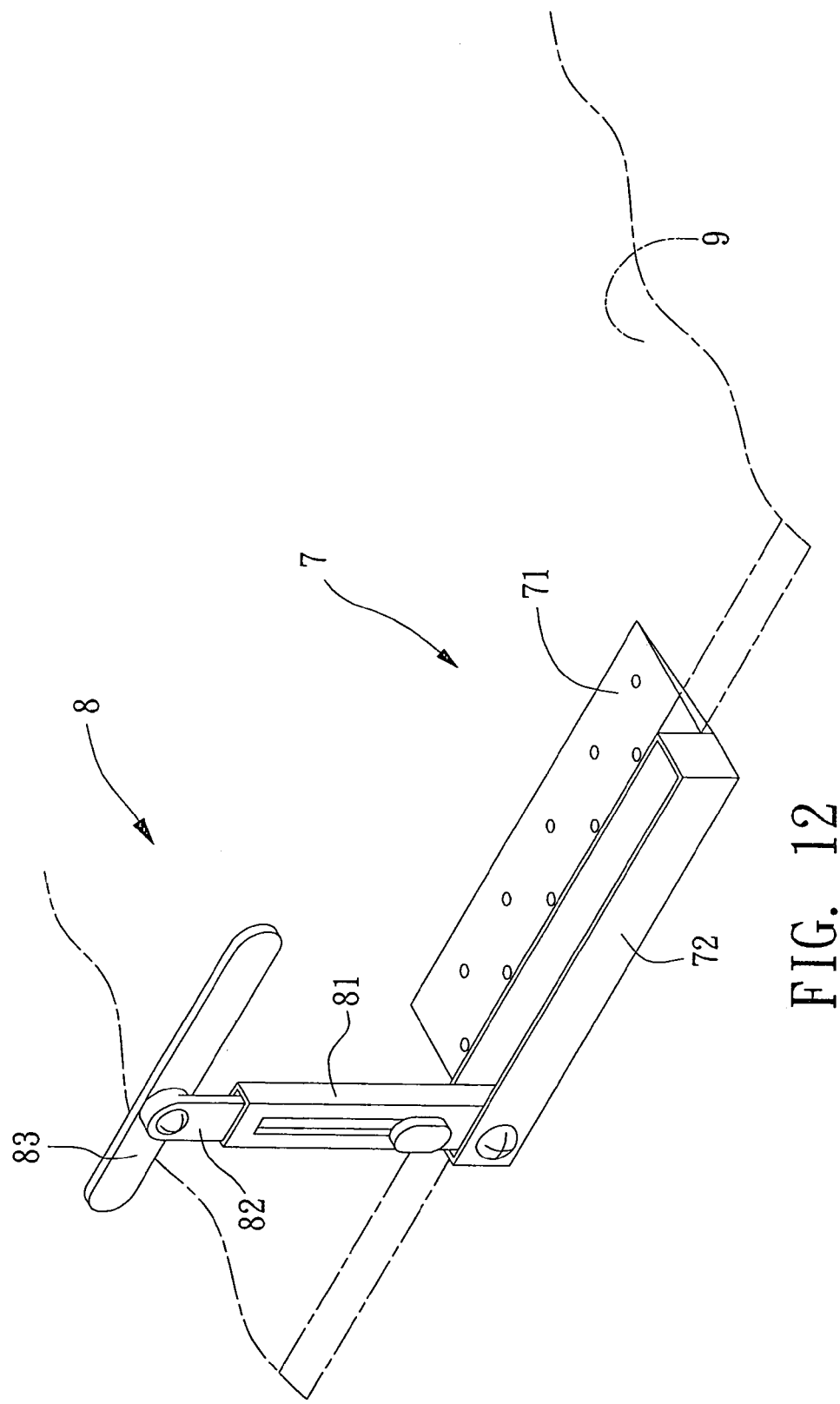
FIG. 12 is another conventional eyes protector for preventing the user's eyes from becoming myopic in accordance with the prior art.

With reference to FIG. 10, to operate the portable eyes protector of the preferred embodiment of the present invention, the pencil case (13) is put on the desk in the reading environment. The switch (21) of the brightness sensor (2) is turned on for measuring the brightness of the surrounding environment. Then, the telescopic rod (33) extends toward the eyes of the user to form an angle with the tabletop between 45 to 60 degrees for the user to maintain a suitable pose and the distance between the tabletop and the eyes of the user.

Although the invention has been explained in relation to its preferred embodiment, it is to be understood that many other possible modifications and variations can be made without departing from the spirit and scope of the invention as hereinafter claimed.

What is claimed is:

1. A portable eyes protector for preventing the user's eyes from becoming myopic, comprising;
    a body defining a writing instrument, said writing instrument having a first writing end and a second opposite to the first writing end, the writing instrument including a shank;
    a brightness sensor being mounted in the shank and flush with an outer periphery of the shank for sensing brightness of the surrounding environment; and
    a distance measurer being mounted to a second end of the shank for measuring a distance between the user's eves and a tabletop, said distance measurer defining a telescopic rod;
    whereby the brightness sensor is provided to confirm that the brightness of the surrounding environment is bright enough for reading and the distance measurer is provided to remind the user to maintain a suitable pose during reading.

2. The portable eyes protector as claimed in claim 1, wherein the brightness sensor comprises an electric device with an intensity reflector for measuring the brightness, a switch for starting the electric device, a lamp for showing a light ray with different color due to the measured brightness and a battery connected to the electric device for providing power.

3. The portable eyes protector as claimed in claim 1, wherein the shank and the telescopic rod have has total length between 40 cm and 50 cm when the telescopic rod extends.

4. A portable eyes protector for preventing the user's eyes from becoming myopic, comprising:
    a body defining a ruler;
    a brightness sensor being buried in the ruler and flush with a top surface of the ruler; and
    a distance measurer being designed as a telescopic plank that is partially slidably received and longitudinally moved relative to the ruler, a groove longitudinally defined in the ruler for partially receiving the telescopic plank and a stopper downward extending from the ruler into the groove, the telescopic plank including one end slidably received in the groove and having a protrusion extending therefrom and selectively engaged to the stopper of the ruler, whereby the brightness sensor is provided to confirm that the brightness of the surrounding environment is bright enough for reading and the distance measurer is provided to remind the user to maintain a suitable pose during reading.

5. The portable eyes protector as claimed in claim 4, wherein a total length of the portable eyes protector is set from 40 cm to 50 cm when the protrusion is engaged to the stopper of the ruler.

6. A portable eyes protector for preventing the user's eyes from becoming myopic, comprising:

a body defining a pencil case;

a brightness sensor mounted in the body and flush with an outer periphery of the body for sensing a brightness of the surrounding environment; and a distance measurer definfing a telescopic rod that is laterally mounted to one side of the pencil case, whereby the brightness sensor is provided to confirm that the brightness of the surrounding environment is bright enough for reading and the distance measurer is provided to remind the user to maintain a suitable pose during reading.

7. The portable eyes protector as claimed in claim 6 wherein a total length of the telescopic rod is set between 40 cm to 50 cm when the telescopic rod fully extends.

* * * * *